Patented Feb. 17, 1942

2,273,765

UNITED STATES PATENT OFFICE 2,273,765

WATER - SOLUBLE COMPLEX GOLD - PEPTONE - SACCHARIDE COMPOUNDS AND THEIR MANUFACTURE

Alois Schwarzmann, Basel, Switzerland

No Drawing. Application May 10, 1940, Serial No. 334,467. In Switzerland May 20, 1939

8 Claims. (Cl. 260—211)

It has been found that new water-soluble complex gold-peptone-saccharide compounds are obtained by the reaction of a gold salt with a peptone and a compound of the sugar series.

For the preparation of these new compounds may be used mono-, di- and tri-saccharides as well as the poly-saccharides. There may be named glucose, milk-sugar, cane-sugar, maltose, raffinose, cellobiose, starch, gum-arabic etc.

As peptones (whereby also albumoses are understood), are used the products known under this name, obtained from the decomposition of albumen and still showing some part of the albumen reactions. These compounds, of which numerous examples are to be found in trade, may be obtained in known manner through hydrolysis of animal or vegetable albuminates (albumen of lupine, gluten, aleuron, egg-albumen, bloodserum, blood fibrin, muscles, organs, tissues, pulverized meat, pulverized fish, milk, casein, silk, gelatine etc.) (see Ullmann, Enzyklopädie der techn. Chemie 1931, VIII, pages 319–21).

In the preparation of the new complexes the acid reaction is absolutely essential. In general it is not necessary to acidify the reaction medium as the gold salts, as salts of a noble metal, dissociate very easily giving sufficient acid. Alkaline reaction leads, contrary to the acid reaction, to the red, violet to blue gold-colloids, often described in literature, which differentiate themselves very easily from the greenish-yellow solutions of the new complexes.

As gold-salts the goldchloro- and -bromocompounds are especially suitable but all others which come into commerce may also be used. There may be named: the auric-chloride and -bromide; goldchloride, crystallized yellow (=AuCl₃.HCl+4H₂O), goldbromide hydrobromide and their sodium, potassium and ammonium salts, auric-cyanide etc.

It is already known that gold-salts react with peptone or other water soluble albuminoid-decomposition-products. The resulting compounds are, however, insoluble in water. By treatment with excess of albumen solution they may be obtained in soluble form. They contain, however, the gold not in chemically-bound but in free colloidal form. Aqueous solutions are therefore deep red or violet in colour and tend to flocculate very easily. On the other hand, from the present process, true complex compounds are obtained, whose yellow aqueous solutions are completely stable. This is of outstanding importance, for example in the preparation of injection-solutions. The new compounds distinguish themselves by especial therapeutic properties.

The following examples illustrate the invention, the parts being by weight:

Example 1

10 parts by weight of peptone or albumose are dissolved in 100 parts by weight of water, filtered, if necessary from undissolved matter and treated cold with excess 10% auric-chloride-solution. The precipitated water-insoluble product is added to a boiling solution of 1 part by weight of any sort of starch in 1000 parts by weight of water and quickly brought into solution. The solution is further heated until the excess of the added gold has precipitated, filtered clear and slowly evaporated to dryness on the water-bath. The product is a yellowish-brown powder of characteristic, sweetish smell, which contrary to the corresponding concentration of peptone or starch dissolves in water immediately to a clear solution. It contains about 5% of gold in the complex. The final product does not show the typical iodine reaction of starch nor the gold reaction with alkalies.

Example 2

A solution of 1 part of casein-peptone in 10 parts of water is treated with 0.5 part of (AuCl₄)H.4H₂O. By stirring, the gold-salt is brought into solution, forming immediately the difficultly soluble gold-peptone. This suspension is gradually added, in portions, to 100 parts of a boiling 1:1000 solution of gum-agar. The separation of metallic gold begins immediately. It is boiled weakly until separation is complete, and filtered hot, or after cooling. Finally a greenish yellow solution of the gold-peptone-agar-complex is obtained, which may be purified by dialysis, if necessary after neutralisation of the hydrochloric acid.

Example 3

1 part of peptone (salt free) from yeast or pulverized meat is dissolved in 100 parts of a 1:1000 solution of gum-arabic and 10 parts of a 6% (AuCl₄)Na.2 aq. solution is slowly added to the hot solution. Immediately the acid reaction is obtained. After completion of the separation of the excess gold, which separates in a black form, the whole is filtered, if necessary dialyzed, and evaporated.

The same compound may be obtained without heating, if the above mentioned reaction-mixture is allowed to stand by room temperature for a longer time.

In place of the poly-saccharides given in the above examples other compounds of the sugar-series such as glucose, milk-sugar, cane-sugar, maltose, raffinose, cellobiose, etc. may be used. The peptones used and the gold salts may also be replaced by other compounds mentioned in the description. The proportions may likewise be varied within fairly wide limits and the conditions so chosen as to give an easily filterable final solution. The new compounds are not precipitated by salting out but by special precipitants such as picric acid.

What I claim is:

1. A process for the manufacture of water-soluble gold-peptone-saccharide-complexes, comprising causing a gold salt to act upon a peptone and a water-soluble member of the group consisting of mono-, di-, tri- and polysaccharides in aqueous weakly acid solution as long as metallic gold is separated out and removing the metal.

2. A process for the manufacture of a water-soluble gold-peptone-saccharide-complex, comprising causing an excess of $AuCl_3.HCl$ to act upon a casein-peptone and gum-agar in an aqueous weakly acid solution as long as metallic gold is separated out and removing the metal.

3. A process for the manufacture of a water-soluble gold-peptone-saccharide-complex, comprising causing an excess of $AuCl_4.Na$ to act upon yeast-peptone and gum arabic in aqueous weakly acid solution as long as metallic gold is separated out and removing the metal.

4. A process for the manufacture of a water-soluble gold-peptone-saccharide-complex, comprising causing an excess of auric chloride to act upon casein-peptone and starch in aqueous weakly acid solution as long as metallic gold is separated out and removing the metal.

5. The water-soluble gold-peptone-saccharide-complexes prepared according to claim 1 as reaction product from a gold salt, a peptone and a water-soluble member of the group consisting of mono-, di-, tri- and polysaccharides.

6. The water-soluble gold-peptone-saccharide-complex prepared according to claim 2 as reaction product from $AuCl_3.HCl$ in excess with casein-peptone and gum-agar.

7. The water-soluble gold-peptone-saccharide-complex prepared according to claim 3 as reaction product from $AuCl_4.Na$ in excess with yeast peptone.

8. The water-soluble gold-peptone-saccharide-complex prepared according to claim 4 as reaction product from auric chloride in excess with casein-peptone.

ALOIS SCHWARZMANN.